(12) United States Patent
Turnquist et al.

(10) Patent No.: US 8,052,375 B2
(45) Date of Patent: Nov. 8, 2011

(54) FLUIDIC SEALING FOR TURBOMACHINERY

(75) Inventors: Norman Arnold Turnquist, Sloansville, NY (US); Kevin L. Bruce, Greer, SC (US); Ciro Cerretelli, Munich (DE); John Ernest Tourigny, Simpsonville, NY (US)

(73) Assignee: General Electric Company, Schenectady, NY (US)

( * ) Notice: Subject to any disclaimer, the term of this patent is extended or adjusted under 35 U.S.C. 154(b) by 827 days.

(21) Appl. No.: 12/131,193

(22) Filed: Jun. 2, 2008

(65) Prior Publication Data
US 2009/0297341 A1 Dec. 3, 2009

(51) Int. Cl.
*F04D 27/02* (2006.01)
(52) U.S. Cl. ....................... 415/58.5; 415/57.4; 415/58.7
(58) Field of Classification Search .................. 415/58.5, 415/58.4, 58.7, 145, 173.1, 173.4, 914
See application file for complete search history.

(56) References Cited

U.S. PATENT DOCUMENTS

| 5,282,718 | A | | 2/1994 | Koff et al. |
| 5,308,225 | A | | 5/1994 | Koff et al. |
| 5,431,533 | A | * | 7/1995 | Hobbs .......................... 415/58.7 |
| 5,474,417 | A | | 12/1995 | Privett et al. |
| 5,607,284 | A | * | 3/1997 | Byrne et al. ................. 415/58.5 |
| 2006/0110247 | A1 | | 5/2006 | Nelson et al. |

* cited by examiner

*Primary Examiner* — David Nhu
(74) *Attorney, Agent, or Firm* — Cantor Colburn LLP

(57) ABSTRACT

Disclosed is a seal for turbomachinery including a seal face locatable between a first turbomachinery component and a second turbomachinery component. At least one fluid channel extends through the seal. The at least one fluid channel is capable of injecting fluid flow between the first turbomachinery component and the second turbomachinery component at the seal face thereby disrupting a leakage flow between the first turbomachinery component and the second turbomachinery component. Further disclosed is a turbomachine utilizing the seal.

20 Claims, 8 Drawing Sheets

FLUIDIC SEALING FOR TURBOMACHINERY

BACKGROUND

The subject invention relates to turbomachinery. More particularly the subject invention relates to sealing between turbomachinery components.

In a typical turbomachine, seals are utilized at various locations to prevent fluid flow from leaking around a desired flowpath. For example, seals are provided between rotating bucket tips and a stationary casing to direct flow past the buckets rather than between the bucket tips and the casing. Seals may also be utilized between a rotor and a stationary component in the form of one or more packing rings. Typical seal configurations include labyrinth seals, brush seals, abradable seals, patterned abradable seals and compliant plate seals. A labyrinth seal, for example, in the turbomachine typically includes one or more teeth extending from a first component toward a second component to create a tortuous path for fluid flow between the components. During operation of the turbomachinery, however, the teeth may rub on the second component and become damaged thereby increasing a gap between the teeth and the second component and subsequently allowing for increased leakage which negatively impacts efficiency of the turbomachine.

BRIEF DESCRIPTION OF THE INVENTION

According to one aspect of the invention, a seal for turbomachinery includes a seal face locatable between a first turbomachinery component and a second turbomachinery component. At least one fluid channel extends through the seal. The at least one fluid channel is capable of injecting fluid flow between the first turbomachinery component and the second turbomachinery component at the seal face thereby disrupting a leakage flow between the first turbomachinery component and the second turbomachinery component.

According to another aspect of the invention, a turbomachine includes a first turbomachine component, a second turbomachine component, and at least one seal capable of reducing leakage flow between the first turbomachinery component and second turbomachinery component. The at least one seal includes a seal face disposed between the first turbomachinery component and the second turbomachinery component and at least one fluid channel extending through the seal. The at least one fluid channel is capable of injecting fluid flow between the first turbomachinery component and the second turbomachinery component at the seal face thereby disrupting a leakage flow between the first turbomachinery component and the second turbomachinery component.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
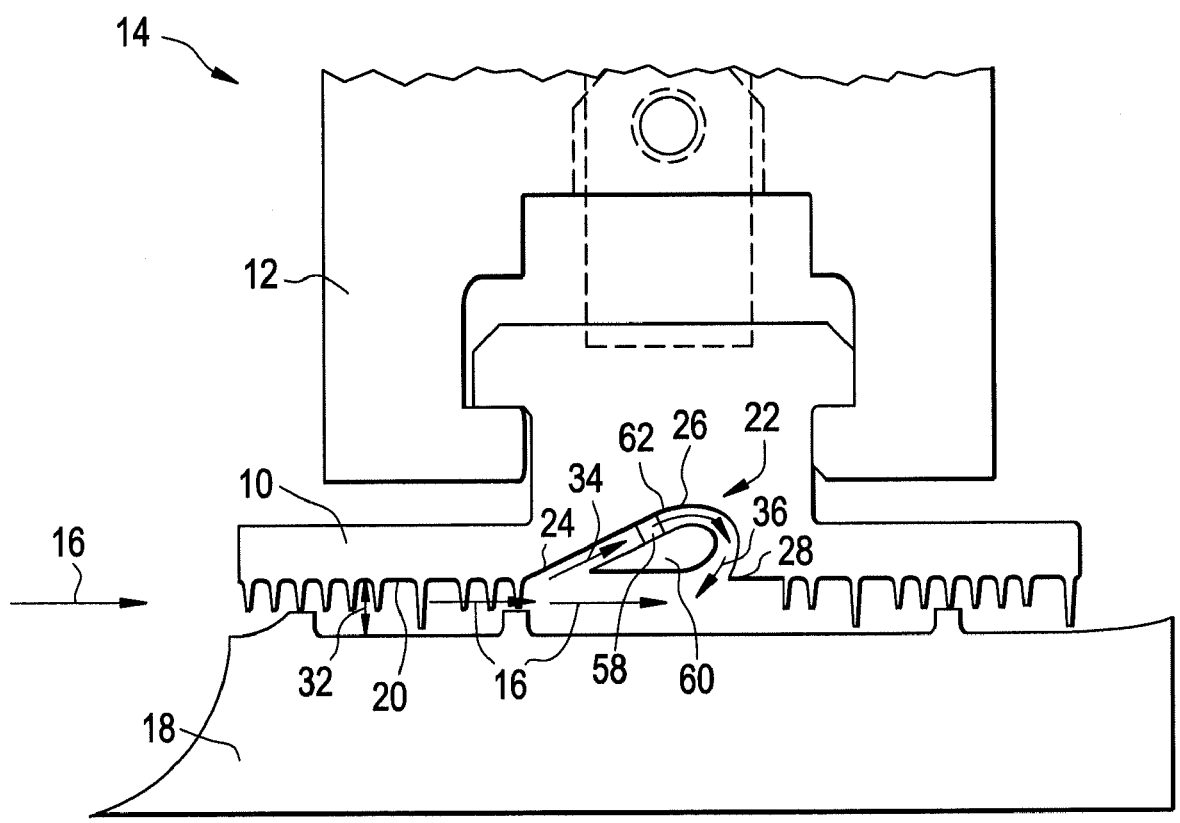
FIG. 1 is a cross-sectional view of an embodiment of a seal for turbomachinery including radial seal teeth.

Shown in FIG. 1 is an embodiment of a packing ring 10 disposed in a casing 12 of a turbomachine 14 with fluid flow through the turbomachine 14 occurring in a generally axial direction 16. The packing ring 10 extends circumferentially around a rotor 18. The packing ring 10 includes a seal face 20 facing the rotor 18. The packing ring 10 includes at least one fluidic diode 22, which includes at least one inlet 24 in flow communication with at least one return channel 26, and at least one outlet 28 in flow communication with the at least one return channel 26. While the embodiment of the packing ring 10 in FIG. 1 has one inlet 24, one return channel 26, and one outlet 28, other configurations having, for example, two inlets 24, two return channels 26, and/or two outlets 28, are contemplated within the scope of the present disclosure. Flow through the turbomachine 14, shown by arrows 16, enters a gap 32 between the seal face 20 and the rotor 18, and a first portion 34 of the flow 16 enters the fluidic diode 22 at the at least one inlet 24. The first portion 34 passes through the at least one return channel 26 and is injected into the flow 16 at an injection angle 36 with a strong velocity component directed against the flow 16 through the at least one outlet 28, located at the seal face 20. In the embodiment of FIG. 1, the at least one inlet 24 is located upstream of the at least one outlet 28, but it is to be appreciated that other locations of the at least one inlet 24 and the at least one outlet 28 are contemplated within the scope of the present disclosure. Injection of the first portion 34 into the flow 16 at an angle 36 conflicting with the flow 16 decreases an effective passage area and results in a disruption of the flow 16. The disruption of flow 16 increases a fluidic resistance of the flow 16 between the seal face 20 and the rotor 18. This increase in fluidic resistance induces a reduction of an amount of leakage between the seal face 20 and the rotor 18.

Figure 2:
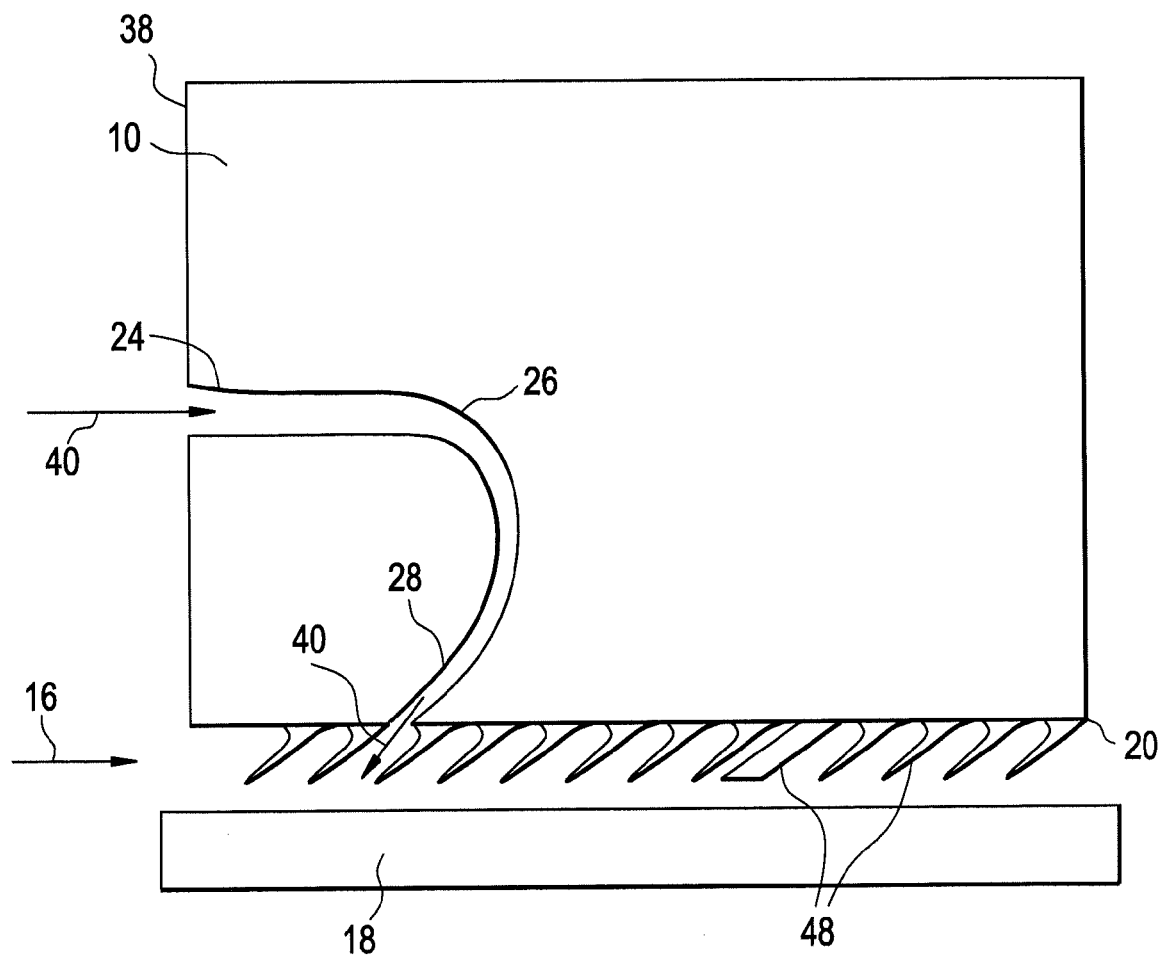
FIG. 2 is a cross-sectional view of an embodiment of a seal for turbomachinery including angled seal teeth.

In the embodiment shown in FIG. 1, the at least one inlet 24 is located at the seal face 20, but it is to be appreciated that the at least one inlet 24 may be disposed at other portions of the packing ring 10. For example, as shown in FIG. 2, in some embodiments the at least one inlet 24 is disposed at an upstream face 38. High pressure fluid 40 enters the at least one inlet 24, and flows through at least one return channel 26 and exits the at least one outlet 28 at the injection angle 36 with a strong velocity component directed against the flow 16.

Figure 3:
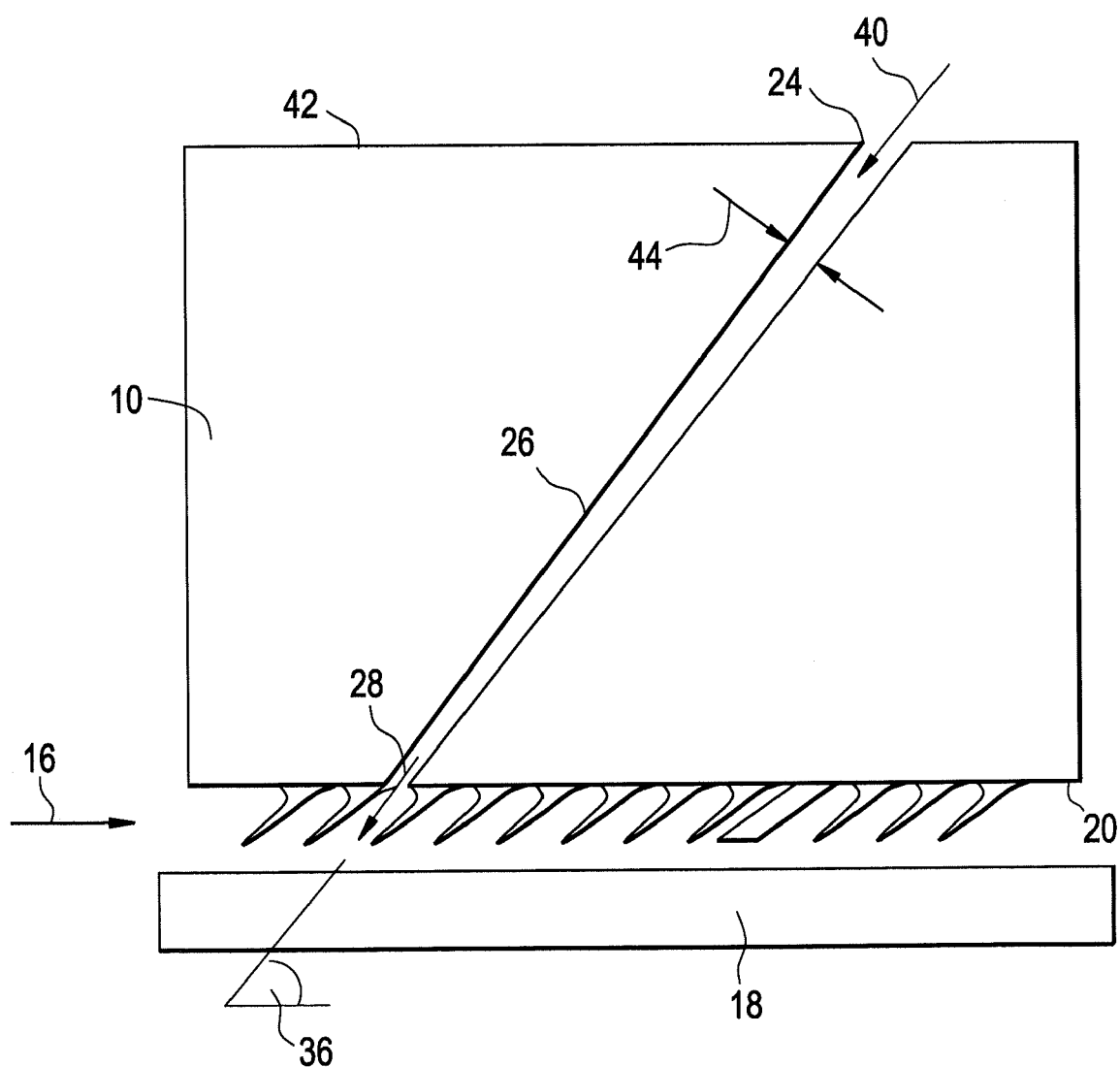
FIG. 3 is a cross-sectional view of another embodiment of a seal for turbomachinery including angled seal teeth.

In another embodiment, as shown in FIG. 3, the at least one inlet 24 is disposed at a radially outboard face 42 of the packing ring 10. The high pressure fluid 40 enters the at least one inlet 24 and flows through the at least one return channel 26. The high pressure fluid 40 exits the at least one outlet 28 at the injection angle 36 with a strong velocity component directed against the flow 16. In this embodiment, the at least one return channel 26 may be substantially straight and additionally may be disposed at an angle substantially equal to the injection angle 36. As shown in FIG. 3, a channel width 44 of the return channel 26 may decrease from the at least one inlet 24 to the at least one outlet 28. The reduction in channel width 46 increases a velocity of the high pressure fluid 40 through the return channel 26 to increase effectiveness of the packing ring 10.

Figure 4:
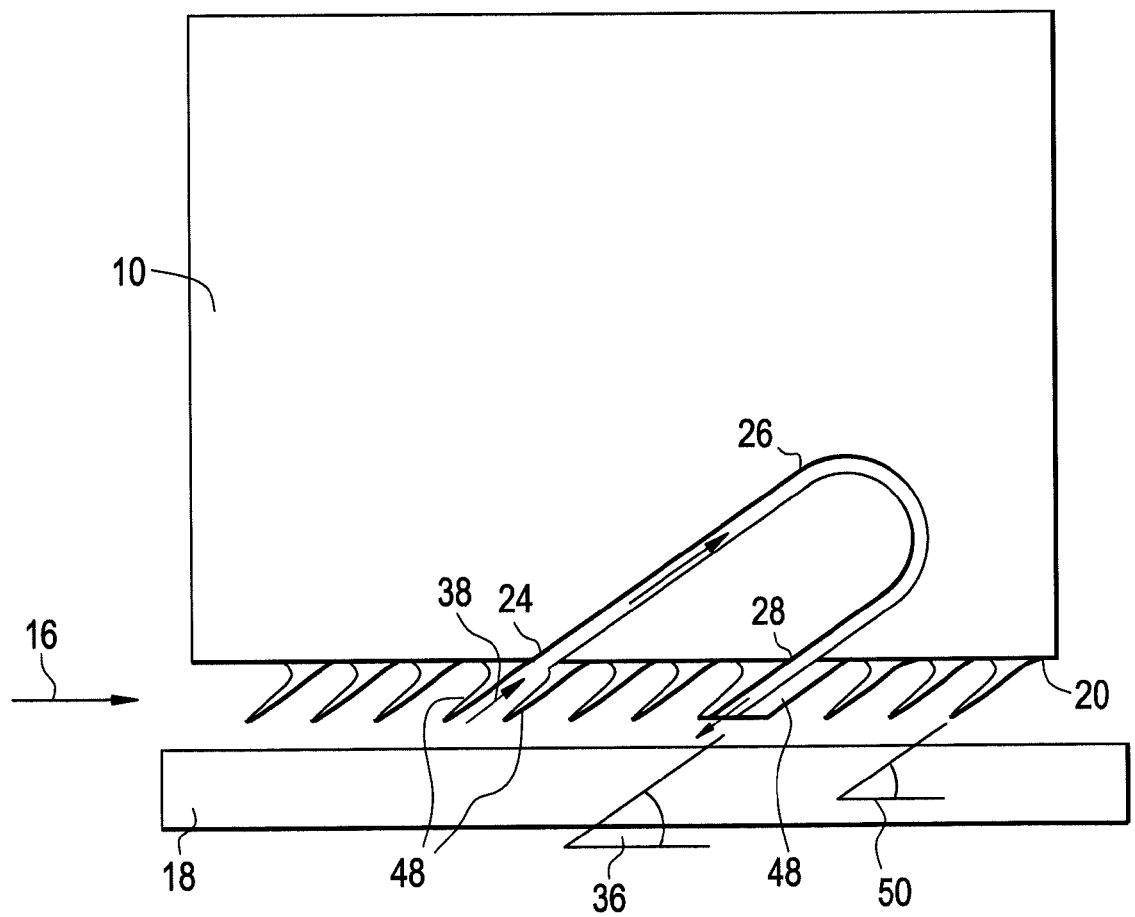
FIG. 4 is a cross-sectional view of yet another embodiment of a seal for turbomachinery including angled seal teeth.
Figure 5:
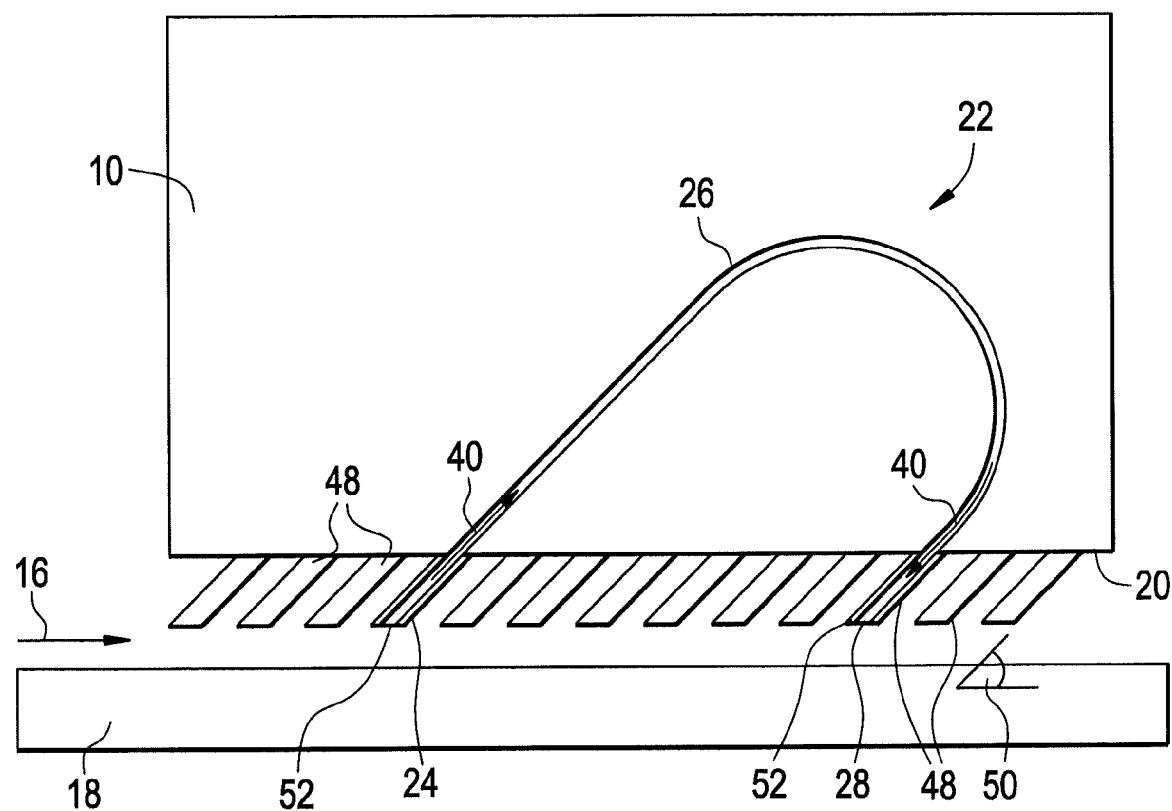
FIG. 5 is a cross-sectional view of still another embodiment of a seal for turbomachinery including angled seal teeth.

Referring to FIG. 4, some embodiments of the packing ring 10 include a plurality of seal teeth 48 extending from the seal face 20 toward the rotor 18. The plurality of seal teeth 48 may extend in a substantially radially inboard direction, or at a tooth angle 50 relative to the seal face 20. In some embodiments, the at least one inlet 24 is disposed at the seal face 20 and located axially between adjacent seal teeth 48. Likewise, the at least one outlet 28 may be disposed between adjacent seal teeth 48. Alternatively, as shown in FIG. 5, at least one inlet 24 and/or at least one outlet 28 may be disposed at a tooth tip 52 of a seal tooth 48. In some embodiments, the injection angle 36 is substantially equal to the tooth angle 50 to improve effectiveness of the packing ring 10.

Figure 6:
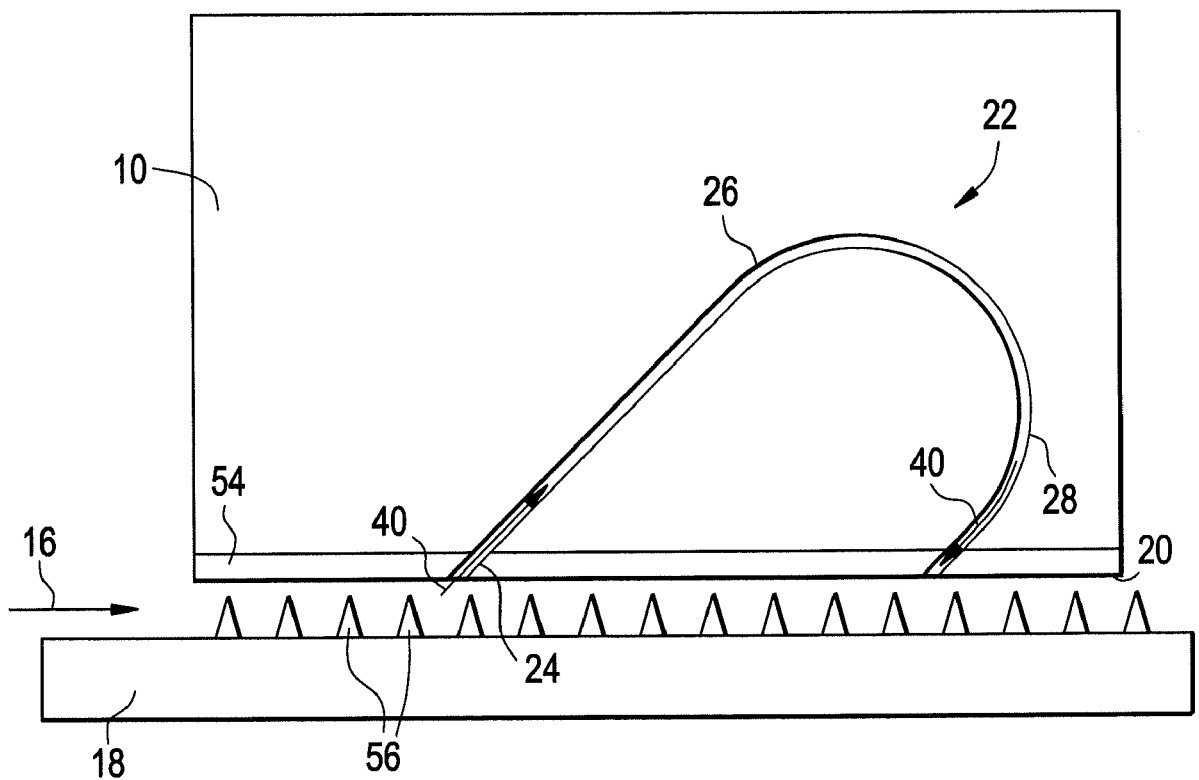
FIG. 6 is a cross-sectional view of an embodiment of a seal for turbomachinery including an abradable seal.

In some embodiments, as shown in FIG. 6, the packing ring 10 may include an abradable seal 54 disposed at the seal face 20. The rotor 18 in some embodiments includes a pattern having a plurality of seal teeth 56. One or more fluidic diodes 22 are disposed such that the at least one inlet 24 and at least one outlet 28 may extend through the abradable seal 54.

Referring again to FIG. 1, the fluidic diode 22 extends circumferentially with the packing ring 10 about the rotor 18. In some embodiments, a plurality of fluidic diodes 22 are arranged circumferentially about the rotor 18 separated by a plurality of supports (not shown). The fluidic diode 22 may be manufactured by one of several means. The fluidic diode 22 may be formed by casting as a unitary, single-piece circumferential ring, with one or more struts 58 extending from an inner diode section 60 to an outer diode section 62. Alternatively, the inner diode section 60 and outer diode section 62 may be formed separately by casting or other means, and assembled with one or more struts 58 into a fluidic diode 22 via, for example, welding or the use of mechanical fasteners.

Figure 7:
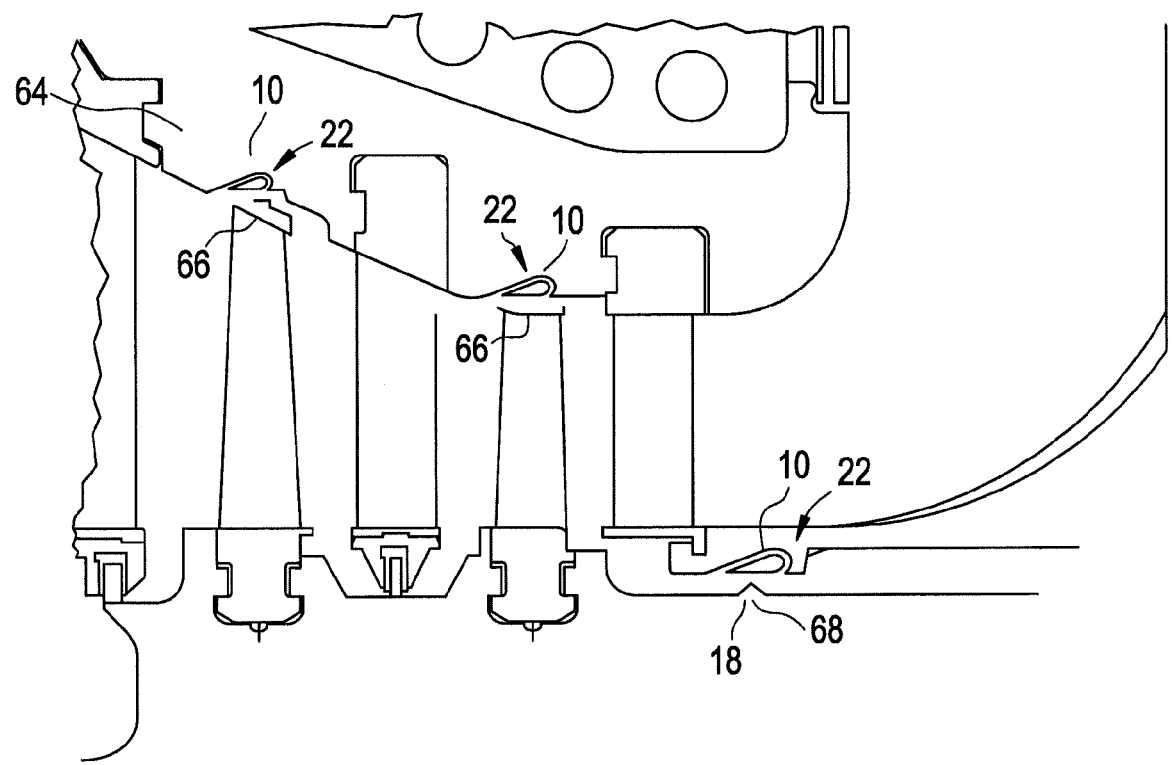
FIG. 7 is a partial cross-sectional view of a turbomachine schematically illustrating locations of the seal of FIG. 1.
Figure 8:
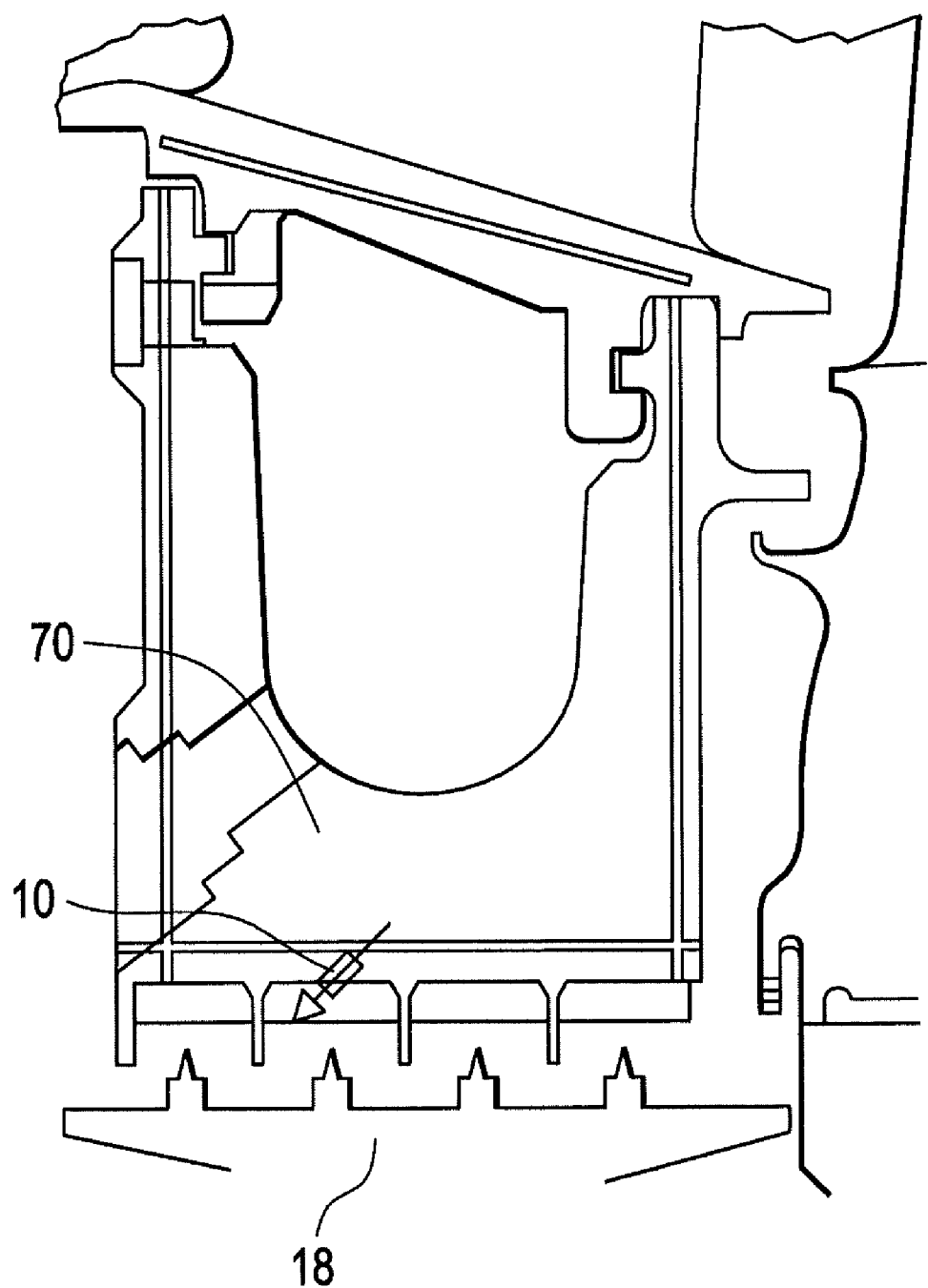
FIG. 8 is a partial cross-sectional view of a turbomachine schematically illustrating an additional location of the seal of FIG. 1.

While to this point, the packing ring 10 has been described as located at the packing casing 12 and sealing to the rotor 18, other locations of the packing ring 10 including at least one fluidic diode 22 are contemplated within the scope of the present disclosure. For example, as shown in FIG. 7, the packing ring 10 including at least one fluidic diode 22 is disposed at a casing 64 to provide sealing between the casing 64 and at least one bucket tip 66. Further, the packing ring 10 including at least one fluidic diode 22 may be located at a hub 68 to provide sealing to the rotor 18. As a further example, illustrated in FIG. 8, the packing ring 10 including at least one fluidic diode 22 may be disposed at a stator 70 to provide sealing between the stator 70 and the rotor 18. These seal locations are merely exemplary of uses of a seal including at least one fluidic diode 22 to enhance robustness of sealing between moving components and stationary components of a turbomachine 14. It is to be appreciated, however that utilization of a seal including a fluidic diode 22 at other locations, for example, between stationary components of a turbomachine, is contemplated within the present scope.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A seal for turbomachinery comprising:
a seal face disposable between a first turbomachinery component and a second turbomachinery component; and
at least one return channel extending through the seal face capable of injecting fluid flow between the first turbomachinery component and the second turbomachinery component at the seal face thereby disrupting a leakage flow between the first turbomachinery component and the second turbomachinery component.

2. The seal of claim 1 wherein at least one outlet of the at least one return channel is disposed at the seal face.

3. The seal of claim 1 wherein at least one inlet of the at least one return channel is disposed at the seal face.

4. The seal of claim 1 wherein at least one inlet of the at least one return channel is disposed at an upstream face of the seal face.

5. The seal of claim 1 wherein the at least one inlet of the at least one return channel is disposed at a radially outboard face of the seal face.

6. The seal of claim 1 including a plurality of seal teeth extending from the seal face toward the second turbomachinery component.

7. The seal of claim 6 wherein at least one outlet of the at least one return channel is disposed between adjacent seal teeth of the plurality of seal teeth.

8. The seal of claim 6 wherein at least one inlet of the at least one return channel is disposed between adjacent seal teeth of the plurality of seal teeth.

9. The seal of claim 6 wherein at least one inlet of the at least one return channel and/or at least one outlet of the at least one return channel is disposed at a tooth tip of a seal tooth.

10. The seal of claim 6 wherein a fluid channel angle at least one inlet and/or at least one outlet is substantially equal to a seal tooth angle of the plurality of seal teeth.

11. The seal of claim 1 wherein the at least one return channel narrows from at least one inlet to at least one outlet.

12. A turbomachine comprising:
a first turbomachinery component;
a second turbomachinery component; and
at least one seal capable of reducing leakage flow between the first turbomachinery component and second turbomachinery component including:
a seal face disposed between the first turbomachinery component and the second turbomachinery component; and
at least one return channel extending through the seal capable of injecting fluid flow between the first turbomachinery component and the second turbomachinery component at the seal face thereby disrupting a leakage flow between the first turbomachinery component and the second turbomachinery component.

13. The turbomachine of claim 12 wherein at least one outlet of the at least one fluid channel and/or at least one inlet of the at least one return channel is disposed at the seal face.

14. The turbomachine of claim 12 including a plurality of seal teeth extending from the seal face toward the second turbomachinery component.

15. The turbomachine of claim 14 wherein at least one outlet of the at least one return channel and/or at least one inlet of the at least one return channel is disposed between adjacent seal teeth of the plurality of seal teeth.

16. The turbomachine of claim 14 wherein at least one outlet of the at least one return channel and/or at least one inlet of the at least one return channel is disposed at a tooth tip of a seal tooth.

17. The turbomachine of claim 12 wherein the first turbomachinery component is a casing.

18. The turbomachine of claim 12 wherein the first turbomachinery component is a packing ring.

19. The turbomachine of claim 12 wherein the second turbomachinery component is a bucket tip.

20. The turbomachine of claim 12 wherein the second turbomachinery component is a rotor.

\* \* \* \* \*